A. B. HURLEY.
HOSE COUPLING AND GUARD.
APPLICATION FILED JUNE 10, 1913.
1,140,307.
Patented May 18, 1915.
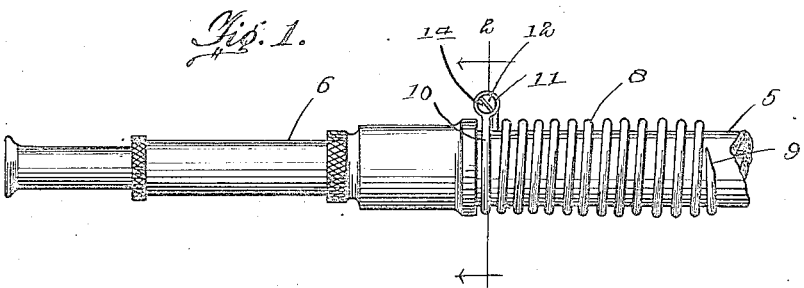
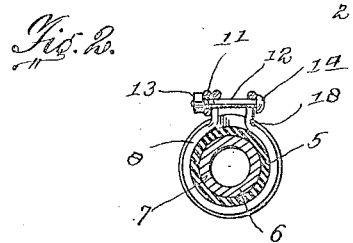
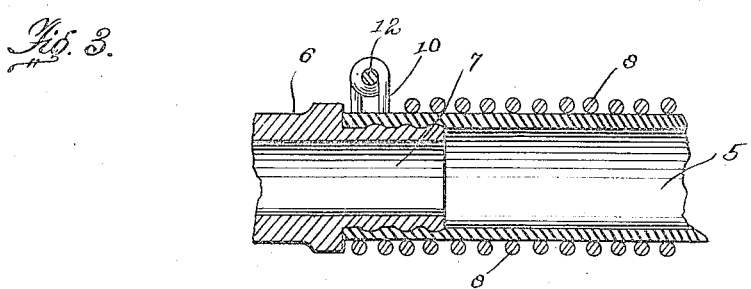
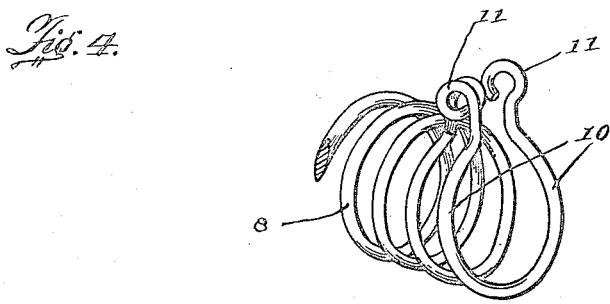
Inventor
Albert B. Hurley.
Witnesses
By Victor J. Evans.
Attorney

UNITED STATES PATENT OFFICE.

ALBERT B. HURLEY, OF SEAFORD, DELAWARE, ASSIGNOR OF ONE-HALF TO LUTHER W. HURLEY, OF SEAFORD, DELAWARE.

HOSE COUPLING AND GUARD.

1,140,307. Specification of Letters Patent. Patented May 18, 1915.

Application filed June 10, 1912. Serial No. 772,877.

*To all whom it may concern:*

Be it known that I, ALBERT B. HURLEY, a citizen of the United States, residing at Seaford, in the county of Sussex and State of Delaware, have invented new and useful Improvements in Hose Couplings and Guards, of which the following is a specification.

The invention relates to hose couplings, and more particularly to the class of combined hose couplings and guards.

The primary object of the invention is the provision of a device of this character wherein a hose will be reinforced and protected against breakage at the joints therein or where the connections and the nozzle of the usual type are mounted, thereby avoiding the buckling or the short bending of the said hose at such points during usage of the same, thus increasing the life of the hose.

Another object of the invention is the provision of a device of this character which will firmly and securely fasten the connections or nozzle in the hose and also which will afford a hand hold at such points and especially at the nozzle end of the hose.

A further object of the invention is the provision of a device of this character which can be formed from a single length of resilient wire to form a combined fastening and guard for the hose.

A still further object of the invention is the provision of a device of this character which is extremely simple in construction, reliable and efficient in its purposes, and inexpensive in manufacture.

With these and other objects in view, the invention consists in the construction, combination and arrangement of parts as will be hereinafter fully described, illustrated in the drawing, and pointed out in the claims hereunto appended.

In the drawing:—Figure 1 is a fragmentary side view of a hose with a device constructed in accordance with the invention applied. Fig. 2 is a sectional view on the line 2—2 of Fig. 1. Fig. 3 is a longitudinal sectional view of the same. Fig. 4 is a fragmentary perspective view of the device removed from the hose.

Similar reference characters indicate corresponding parts throughout the several views in the drawing.

Referring to the drawing by numerals, 5 designates a portion of a garden hose and 6 the nozzle which is of the ordinary well known construction, the coupling sleeve 7 of which is fastened in the hose by means of the device presently described.

The device comprises a convoluted section 8 which is formed from a single length of resilient wire, one end of which is brought in juxtaposition to the adjacent convolution and is beveled at 9 to avoid a protuberance or blunt terminal on the wire, while the opposite end is bent to form a binding ring 10 having out-turned parallel alining eyes 11 through which is passed a bolt 12 carrying a nut 13 which is adjustably threaded thereon, while the head 14 of the bolt works against one of the eyes and the nut works against the other eye so that the ring 10 can be drawn tight for the fastening of the coupling sleeve of a nozzle or other connection for a hose therein.

The device is applied externally on the hose so that the convolutions will surround the hose, the length of the device being variable and when surounding the hose will protect it from short bending or buckling, thereby obviating the puncturing of the said hose during its use. The device also serves as a hand grip to permit the convenient manipulation thereof when watering lawns or otherwise using the hose. The eyes 11 are twisted from the single length of wire and by adjusting the nut on the bolt the ring 10 will bind the hose tightly against the coupling sleeve 7 of the nozzle, thereby securely and firmly fastening it to the hose. This device is adapted for use on the hose at any point where connections are mounted therein and materially reinforces the hose and avoids leakage at said points of connection and adjacent thereto.

From the foregoing it is thought that the construction and manner of operation of the device will be clearly understood, and therefore a more extended explanation has been omitted.

What is claimed is:—

1. As an article of manufacture, a hose coupling comprising a single strand of relatively stiff wire of uniform size in cross section throughout its extent and bent to form a clamping loop and a convoluted portion at one side of the said loop, the said wire being further bent to form double and single eyes disposed opposite each other, the double eye being located between the clamping loop and the convoluted portion, one end of the wire being beveled to lie substantially in the plane of the outermost convolution, and means passed through the said eyes for contracting the clamping loop.

2. A combined hose brace and coupling member comprising an elongated spiral bracing member constructed of a single strand of wire and bent back upon itself adjacent one terminal thereof to form a clamping loop and a bolt receiving eye, and a second opposed bolt receiving eye formed at the free terminal of said loop.

In testimony whereof I affix my signature in presence of two witnesses.

ALBERT B. HURLEY.

Witnesses:
L. W. HURLEY,
C. H. CARTER.